(12) United States Patent
Cozad

(10) Patent No.: US 6,607,283 B1
(45) Date of Patent: Aug. 19, 2003

(54) THROUGH DOOR VIEWER DEVICE

(76) Inventor: Kevin L. Cozad, 12063 SW. Steamboat Dr., Beaverton, OR (US) 97008

( * ) Notice: Subject to any disclaimer, the term of this patent is extended or adjusted under 35 U.S.C. 154(b) by 0 days.

(21) Appl. No.: 10/014,209

(22) Filed: Nov. 9, 2001

(51) Int. Cl.[7] .............................................. F21V 33/00
(52) U.S. Cl. ...................................... 362/100; 362/276
(58) Field of Search ................................. 362/100, 253, 362/268, 227; 359/799, 802, 808, 738, 504, 744, 793

(56) References Cited

U.S. PATENT DOCUMENTS

| 4,082,434 A |   | 4/1978  | Hayashi et al. |
|-------------|---|---------|----------------|
| 4,172,636 A |   | 10/1979 | Yanagimachi    |
| 4,269,474 A | * | 5/1981  | Kamimura ................... 359/504 |
| 4,809,320 A | * | 2/1989  | Hawkins et al. ............ 359/504 |
| 5,339,227 A |   | 8/1994  | Jones          |
| 5,442,532 A |   | 8/1995  | Boulos et al.  |
| 5,856,727 A |   | 1/1999  | Schroeder et al. |

* cited by examiner

*Primary Examiner*—Y. My Quach-Lee

(57) ABSTRACT

A through door viewer device for improving security at a house or apartment. The through door viewer device includes a first tubular member having open ends and a bore extending therethrough and being adapted to be securely disposed in a hole in a door; and also includes a second tubular member having front and back open ends and a bore extending therethrough and being disposed in the first tubular member and being adapted to extend through the hole in the door; and further includes a transparent bezel being adapted to be mounted to the door; and also includes magnifying lens being disposed in the second tubular member; and further includes a housing being adapted to mount upon a side of the door; and also includes a light-emitting assembly including light-emitting members being disposed behind one of the magnifying lens for illuminating a person standing outside the door.

10 Claims, 4 Drawing Sheets

THROUGH DOOR VIEWER DEVICE

BACKGROUND OF THE INVENTION

1. Field of the Invention

The present invention relates to door viewers and more particularly pertains to a new through door viewer device for improving security at a house or apartment.

1. Description of the Prior Art

The use of door viewers is known in the prior art. More specifically, door viewers heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,172,636; U.S. Pat. No. 5,856,727; U.S. Pat. No. 4,082,434; U.S. Pat. No. 5,339,227; and U.S. Pat. No. 5,442,532.

While these devices fulfill their respective, particular objectives and requirements, the aforementioned patents do not disclose a new through door viewer device. The inventive device includes a first tubular member having open ends and a bore extending therethrough and being adapted to be securely disposed in a hole in a door; and also includes a second tubular member having front and back open ends and a bore extending therethrough and being disposed in the first tubular member and being adapted to extend through the hole in the door; and further includes a transparent bezel being adapted to be mounted to the door; and also includes magnifying lens being disposed in the second tubular member; and further includes a housing being adapted to mount upon a side of the door; and also includes a light-emitting assembly including light-emitting members being disposed behind one of the magnifying lens for illuminating a person standing outside the door.

In these respects, the through door viewer device according to the present invention substantially departs from the conventional concepts and designs of the prior art, and in so doing provides an apparatus primarily developed for the purpose of improving security at a house or apartment.

SUMMARY OF THE INVENTION

In view of the foregoing disadvantages inherent in the known types of door viewers now present in the prior art, the present invention provides a new through door viewer device construction wherein the same can be utilized for improving security at a house or apartment.

The general purpose of the present invention, which will be described subsequently in greater detail, is to provide a new through door viewer device which has many of the advantages of the door viewers mentioned heretofore and many novel features that result in a new through door viewer device which is not anticipated, rendered obvious, suggested, or even implied by any of the prior art door viewers, either alone or in any combination thereof.

To attain this, the present invention generally comprises a first tubular member having open ends and a bore extending therethrough and being adapted to be securely disposed in a hole in a door; and also includes a second tubular member having front and back open ends and a bore extending therethrough and being disposed in the first tubular member and being adapted to extend through the hole in the door; and further includes a transparent bezel being adapted to be mounted to the door; and also includes magnifying lens being disposed in the second tubular member; and further includes a housing being adapted to mount upon a side of the door; and also includes a light-emitting assembly including light-emitting members being disposed behind one of the magnifying lens for illuminating a person standing outside the door.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new through door viewer device which has many of the advantages of the door viewers mentioned heretofore and many novel features that result in a new through door viewer device which is not anticipated, rendered obvious, suggested, or even implied by any of the prior art door viewers, either alone or in any combination thereof.

It is another object of the present invention to provide a new through door viewer device which may be easily and efficiently manufactured and marketed.

It is a further object of the present invention to provide a new through door viewer device which is of a durable and reliable construction.

An even further object of the present invention is to provide a new through door viewer device which is susceptible of a low cost of manufacture with regard to both materials and labor, and which accordingly is then susceptible of low prices of sale to the consuming public, thereby making such through door viewer device economically available to the buying public.

Still yet another object of the present invention is to provide a new through door viewer device which provides in the apparatuses and methods of the prior art some of the advantages thereof, while simultaneously overcoming some of the disadvantages normally associated therewith.

Still another object of the present invention is to provide a new through door viewer device for improving security at a house or apartment.

Yet another object of the present invention is to provide a new through door viewer device which includes a first tubular member having open ends and a bore extending therethrough and being adapted to be securely disposed in a hole in a door; and also includes a second tubular member having front and back open ends and a bore extending therethrough and being disposed in the first tubular member and being adapted to extend through the hole in the door; and further includes a transparent bezel being adapted to be mounted to the door; and also includes magnifying lens being disposed in the second tubular member; and further includes a housing being adapted to mount upon a side of the door; and also includes a light-emitting assembly including light-emitting members being disposed behind one of the magnifying lens for illuminating a person standing outside the door.

Still yet another object of the present invention is to provide a new through door viewer device that is easy and convenient to install and use.

Even still another object of the present invention is to provide a new through door viewer device that effectively illuminates the face of the person standing on the other side of the door so that the user can clearly identify that person.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
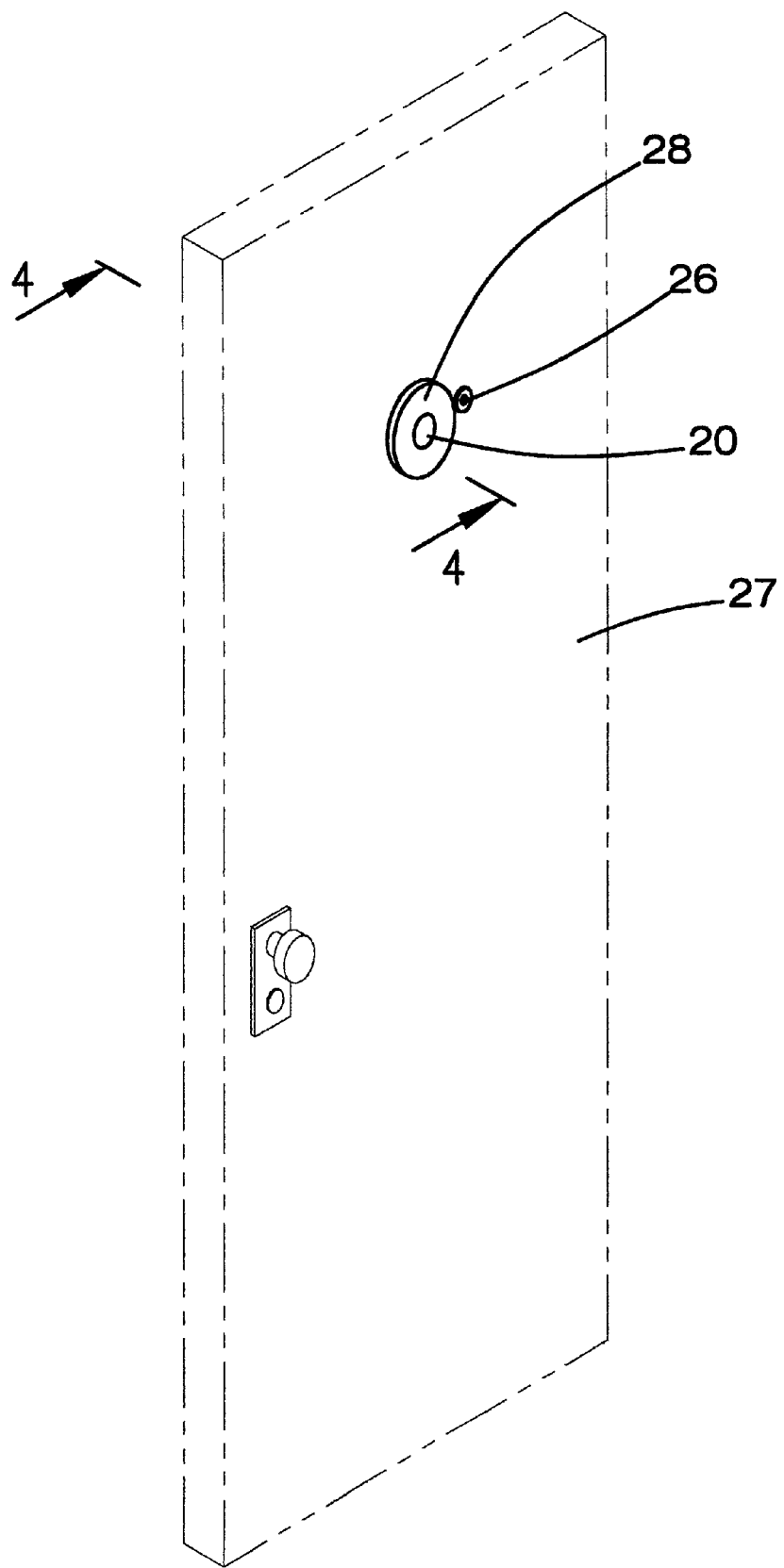
FIG. 1 is a perspective view of a new through door viewer device according to the present invention.
Figure 2:
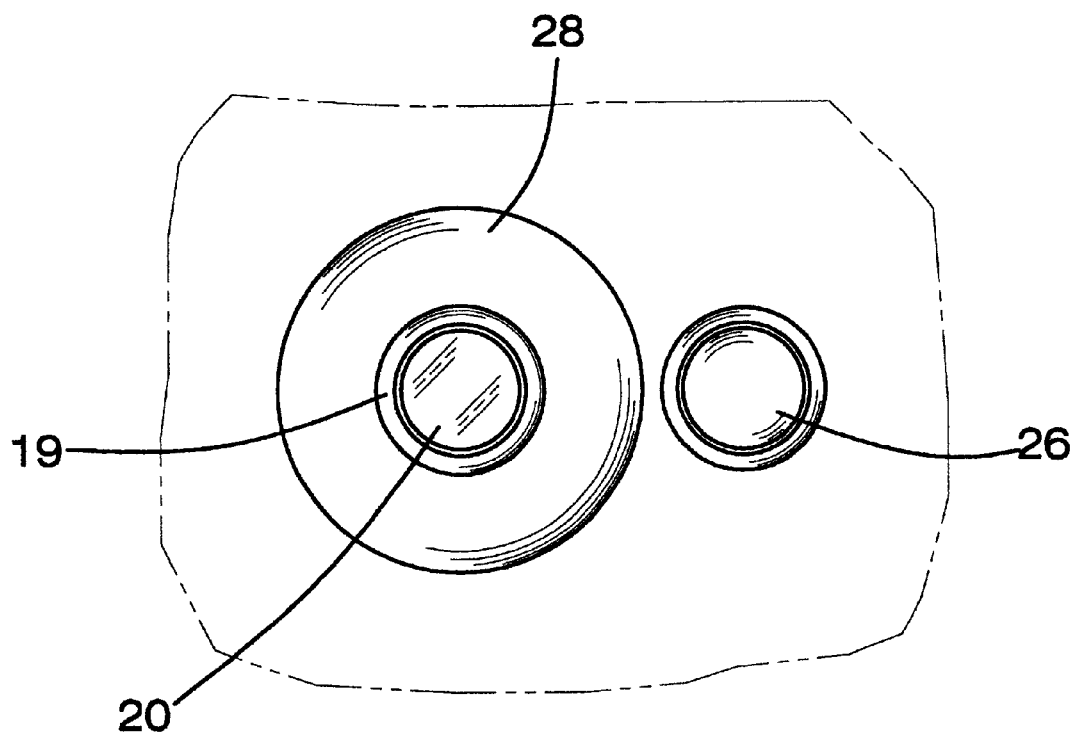
FIG. 2 is a front elevational view of the present invention.
Figure 3:
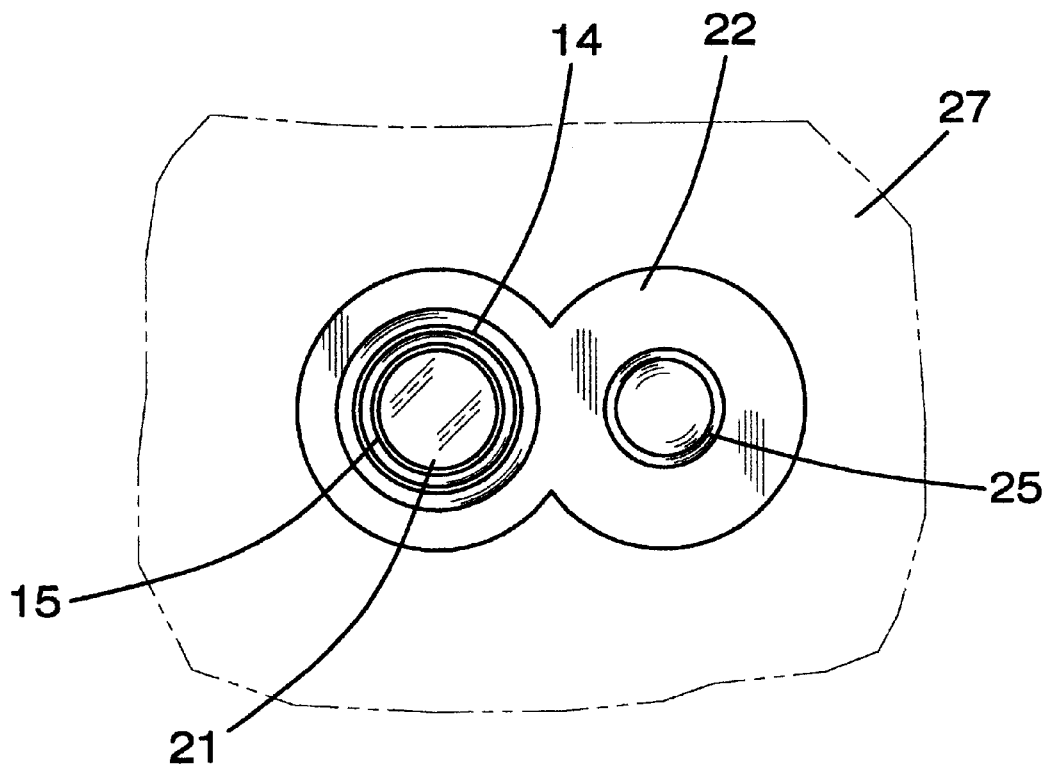
FIG. 3 is a back elevational view of the present invention.
Figure 4:
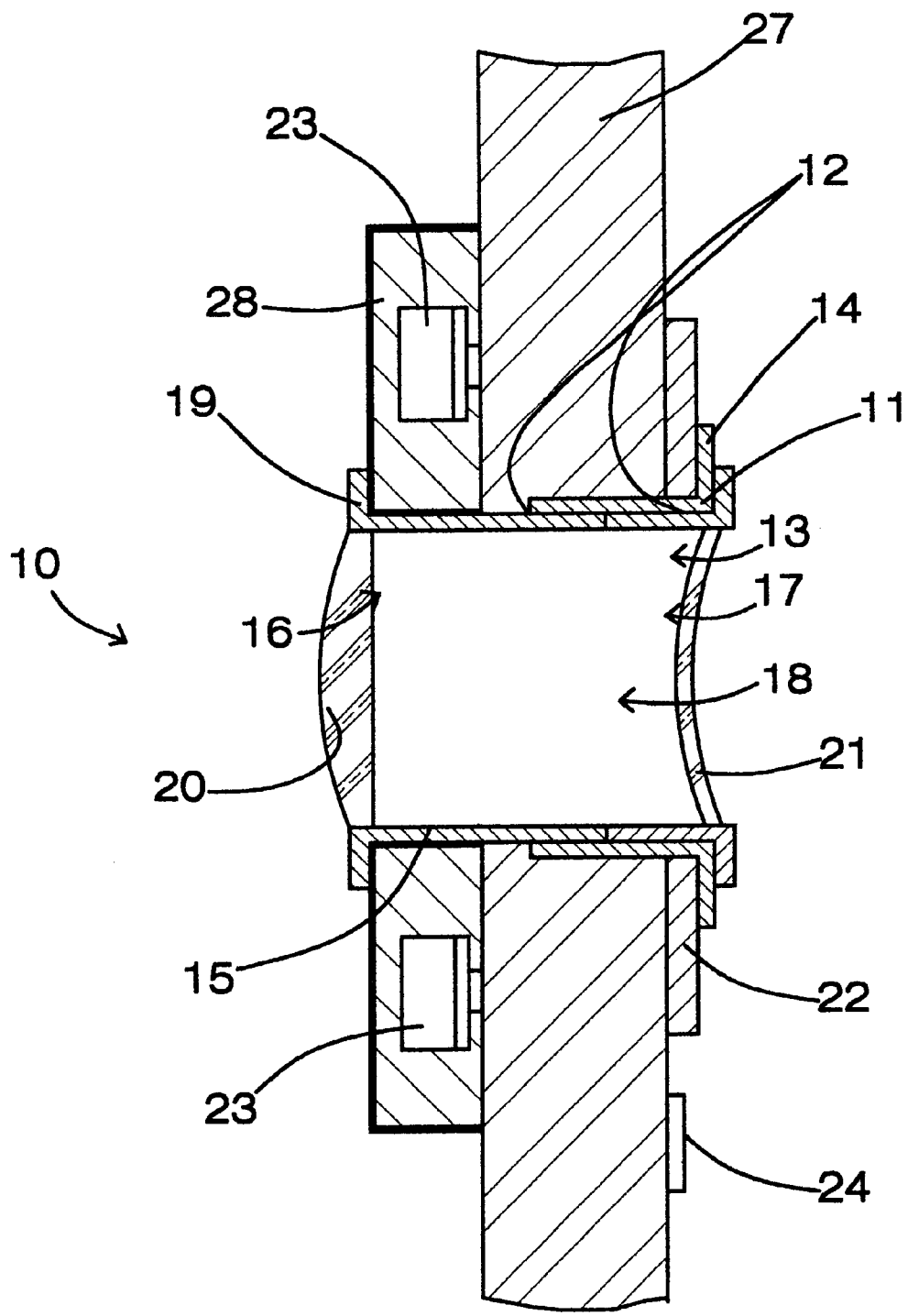
FIG. 4 is a side cross-sectional view of the present invention.
Figure 5:
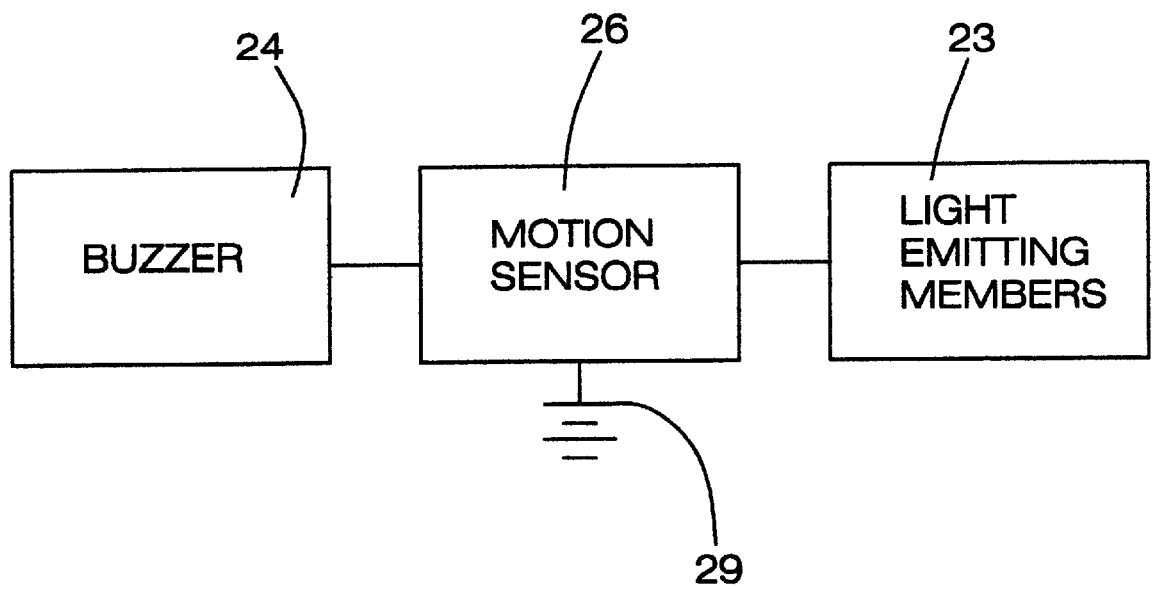
FIG. 5 is a block diagram of the present invention.

With reference now to the drawings, and in particular to FIGS. 1 through 5 thereof, a new through door viewer device embodying the principles and concepts of the present invention and generally designated by the reference numeral 10 will be described.

As best illustrated in FIGS. 1 through 5, the through door viewer device 10 generally comprises a first tubular member 11 having open ends 12 and a bore 13 extending therethrough and being adapted to be securely and conventionally disposed in a hole in a door 27. The first tubular member 11 further includes an annular flange 14 being conventionally disposed about one of the open ends 12 thereof and being adapted to be disposed against the door 27.

A second tubular member 15 has open front and back ends 16,17 and a bore 18 extending therethrough with the second tubular member 15 being conventionally disposed in the first tubular member 11 and being adapted to extend through the hole in the door 27. The second tubular member 15 includes an annular flange member 19 being conventionally disposed about the open front end 16. A transparent bezel is engaged between the annular flange member 19 and the side of the door 27. Magnifying lens 20,21 are conventionally disposed in the second tubular member 15. The magnifying lens 20,21 include a first magnifying lens 20 being conventionally disposed at the open front end 16 of the second tubular member 15, and also include a second magnifying lens 21 being conventionally disposed at the open back end 17 of the second tubular member 15. A housing 22 is adapted to mount upon a side of the door 27.

A light-emitting assembly includes light-emitting members 23 being conventionally disposed behind the bezel 28 for illuminating a person standing outside the door 27. The light-emitting members 23 are disposed near the first magnifying lens 20. The light-emitting assembly further includes at least one battery 29 being conventionally disposed in the housing 22 and being conventionally connected to the light-emitting members 23, and also includes a switch member 25 being depressibly and conventionally mounted upon the housing 22 and being conventionally connected to the at least one battery 29 and to the light-emitting members 23.

In an embodiment the present invention would further include a plurality of light-emitting members 23 for illuminating a person standing outside the door.

As an additional embodiment, the light-emitting assembly further includes a motion sensor 26 being conventionally disposed near the bezel and being connected to the switch member 25 for energizing the light-emitting members 23 upon detecting motion outside of the door 27.

Still an additional embodiment, the present invention would include a buzzer 24 which may also be activated by the motion sensor 26. This version would allow the user to be notified of a person or persons standing outside the door with an audible tone.

In use, the user depresses the switch member 25 when looking through the second magnifying lens 21 which energizes the light-emitting members 23 which shine a beam of line toward the person standing on the other side of the door 27 so that the occupant can see clearly who that person is.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A through door viewer device comprising:
   a first tubular member having open ends and a bore extending therethrough and being adapted to be securely disposed in a hole in a door;
   a second tubular member having front and back open ends and a bore extending therethrough and being disposed in said first tubular member and being adapted to extend through the hole in the door;
   a transparent bezel being adapted to be mounted to the door;
   magnifying lens being disposed in said second tubular member;
   a housing being adapted to mount upon a side of the door;
   a light-emitting assembly including light-emitting members being disposed near one of said magnifying lens for illuminating a person standing outside the door;
   wherein said second tubular member includes an annular flange member being disposed about said front open end; and
   wherein said transparent bezel is engaged between said annular flange member and the door.

2. A through door viewer device as described in claim 1, wherein said first tubular member further includes an annular flange being disposed about one of said open ends thereof and being adapted to be disposed against the door.

3. A through door viewer device as described in claim 1, wherein said magnifying lens includes a first magnifying lens being disposed at said open front end of said second tubular member, and also includes a second magnifying lens being disposed at said open back end of said second tubular member.

4. A through door viewer device as described in claim 1, wherein said light-emitting members are disposed behind said transparent bezel.

5. A through door viewer device as described in claim 4, wherein said light-emitting assembly further includes at least one battery being disposed in said housing and being connected to said light-emitting members, and also includes a switch member being depressibly mounted upon said housing and being connected to said at least one battery and to said light-emitting members.

6. A through door viewer device as described in claim 5, wherein said light-emitting assembly further includes a motion sensor being disposed near said transparent bezel and being connected to said switch member for energizing said light-emitting members upon detecting motion outside of the door.

7. A through door viewer device as described in claim 6, further including a buzzer for producing an audible sound, said buzzer being connected to said motor sensor for causing said buzzer to emit a sound upon detecting motion.

8. A through door viewer device comprising:
   a first tubular member having open ends and a bore extending therethrough and being adapted to be securely disposed in a hole in a door, said first tubular member further including an annular flange being disposed about one of said open ends thereof and being adapted to be disposed against the door;
   a second tubular member having front and back open ends and a bore extending therethrough and being disposed in said first tubular member and being adapted to extend through the hole in the door, said second tubular member including an annular flange member being disposed about said front open end;
   a transparent bezel being adapted to be mounted upon the door, said transparent bezel being engaged between said annular flange member and the door;
   magnifying lens being disposed in said second tubular member, said magnifying lens including a first magnifying lens being disposed at said open front end of said second tubular member, and also including a second magnifying lens being disposed at said open back end of said second tubular member;
   a housing being adapted to mount upon a side of the door; and
   a light-emitting assembly including light-emitting members for illuminating a person standing outside the door, said light-emitting members being disposed behind said transparent bezel, said light-emitting assembly further including at least one battery being disposed in said housing and being connected to said light-emitting members, and also including a switch member being depressibly mounted upon said housing and being connected to said at least one battery and to said light-emitting members.

9. A through door viewer device as described in claim 8, wherein said light-emitting assembly further includes a motion sensor being disposed near said transparent bezel and being connected to said switch member for energizing said light-emitting members upon detecting motion outside of the door.

10. A through door viewer device as described in claim 9, further including a buzzer for producing an audible sound, said buzzer being connected to said motor sensor for causing said buzzer to emit a sound upon detecting motion.

* * * * *